(No Model.)
E. D. MAYERS.
SEEDER AND FERTILIZER DISTRIBUTER.
No. 269,869. Patented Jan. 2, 1883.
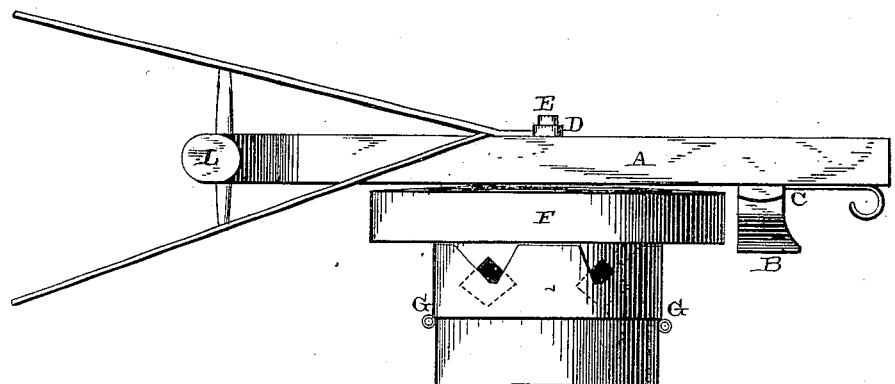
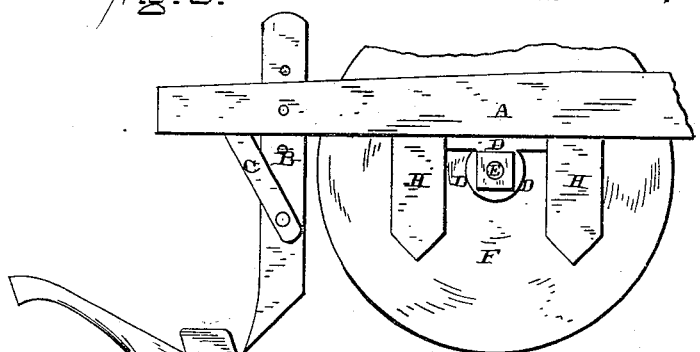
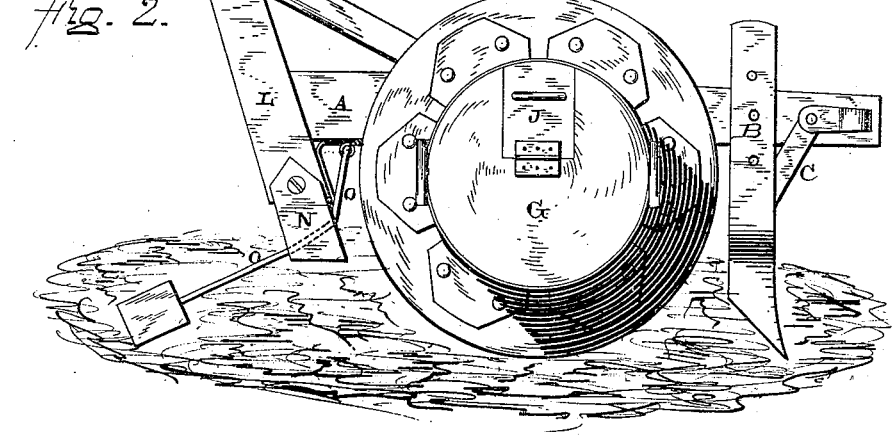
Witnesses — Louis F. Gardner, W. H. Kern
Inventor — E. D. Mayers, per F. A. Lehmann, Att'y

UNITED STATES PATENT OFFICE.

EDWIN D. MAYERS, OF MULLIN'S DEPOT, SOUTH CAROLINA.

SEEDER AND FERTILIZER-DISTRIBUTER.

SPECIFICATION forming part of Letters Patent No. 269,869, dated January 2, 1883.

Application filed September 19, 1882. (No model.)

*To all whom it may concern:*

Be it known that I, E. D. MAYERS, of Mullin's Depot, in the county of Marion and State of South Carolina, have invented certain new and useful Improvements in Seeders and Planters and Fertilizer-Distributers; and I do hereby declare the following to be a full, clear, and exact description of the invention, such as will enable others skilled in the art to which it pertains to make and use it, reference being had to the accompanying drawings, which form part of this specification.

My invention relates to an improvement in seeders and planters and fertilizer-distributers; and it consists in the combination of an ordinary plow-beam, a suitable box or bearing which is secured to the under side of the beam, a revolving cylinder provided with a short shaft which passes through the bearing, and which is braced in position by means of suitable extensions which bear against the side of the cylinder.

It further consists in the arrangement and combination of parts, which will be more fully described hereinafter.

The object of my invention is to provide a machine which can be applied directly to an ordinary plow-beam, so that as the plow is drawn along the machine will either drop the fertilizer or plant seeds of different kinds.

Figure 1 is a plan view of my invention. Fig. 2 is a side elevation of the same. Fig. 3 is a detail view.

A represents a common plow-beam, which has the plow or cultivator standard B secured to it near its front end and braced in position by means of the brace C. This standard is curved outward away from the beam at its lower end, so as to make the furrow directly in line with the dropping-holes in the cylinder. This standard is provided with a series of holes, and can be adjusted up and down, according to the depth of the furrow that is to be made. Secured to the under side of the beam at any suitable point is an ordinary box or bearing, D, through which passes the short shaft E, which projects from the inner side of the head F of the cylinder G. This shaft is just long enough to come through this bearing and receive a nut or other fastening device upon its end, so as to hold the cylinder in place. In order to prevent any strain from being brought to bear upon this bolt, the hangers H are secured to the under side of the beam and bear against the side of the head, as shown. The beam serves to brace the head above its center, and these hangers serve to brace it below, so that it cannot have any lateral play, which would have a tendency to injure the bearings. This head is considerably larger than the cylinder itself, and serves as a wheel which runs upon the ground and causes the cylinder to revolve.

The cylinder G may be made of sheet metal or any other material, and is secured to the outer side of the head. Through its sides at regular intervals are made suitable openings through which the seed or fertilizer is to be dropped, and which openings can be regulated in size by means of the bands I, having their inner edges notched, as shown. There will be a series of these bands to accompany each machine, and each band will have different-sized notches cut in its inner edge, so as to register with the openings in the side of the cylinder. By moving these bands in and out the holes in the cylinder can be increased or decreased in size, so as to regulate either the amount of fertilizer that is dropped or the number of seed. Through the outer side of the cylinder is made a suitable door, J, through which the seed or fertilizer can be introduced.

Secured to the lower end of the standard L, on the rear end of the beam, is the guide N, through which the brace of the covering device O plays up and down. This brace is pivoted at its front end to the under side of the beam and passed downward and backward through the guide to the covering device, which has a free vertical play, so as to allow the covering device to adjust itself to the inequalities of the ground.

Covering devices have heretofore been used which are attached directly to the beam or frame of the machine; but they have not been given this vertical play, as is here shown and described.

Having thus described my invention, I claim—

In a corn-planter, the combination of the beam A, having the box D secured to its under side, the seed-box G, secured to the wheel F, which is provided with the short shaft E, and the braces H, which bear against the lower side of the wheel, the upper portion of the wheel being braced by the beam, substantially as shown and described.

In testimony whereof I affix my signature in presence of two witnesses.

E. D. MAYERS. [L. S.]

Witnesses:
D. S. MONROE,
J. H. LAMBERT.